Oct. 29, 1929.  M. E. CUSHING  1,733,403
LINING FOR HOT GAS CARRYING CONDUITS
Filed June 18, 1928    2 Sheets-Sheet 1
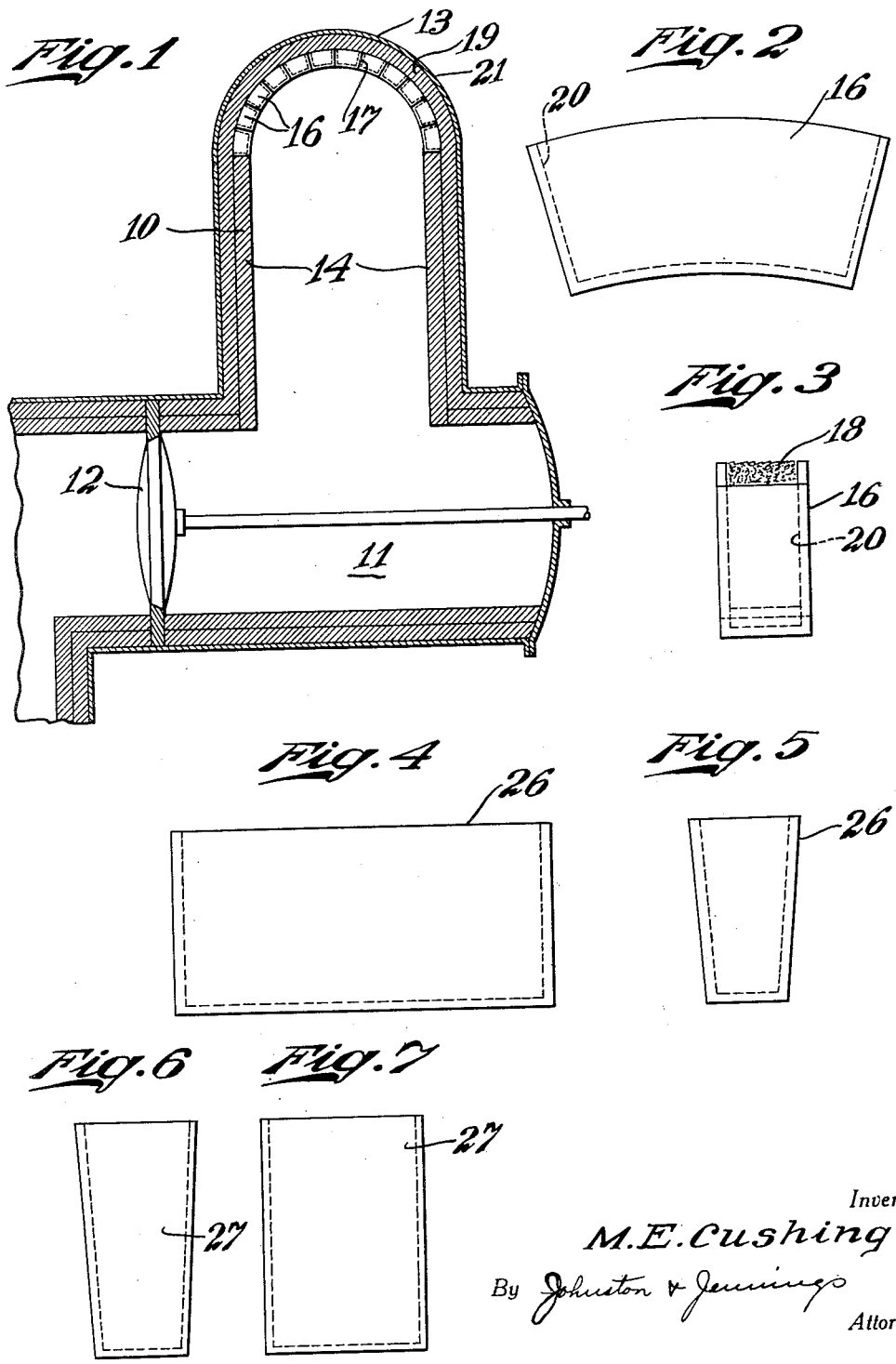
Inventor
M. E. Cushing
By Johnston & Jennings
Attorneys Oct. 29, 1929.  M. E. CUSHING  1,733,403
LINING FOR HOT GAS CARRYING CONDUITS
Filed June 18, 1928  2 Sheets-Sheet 2
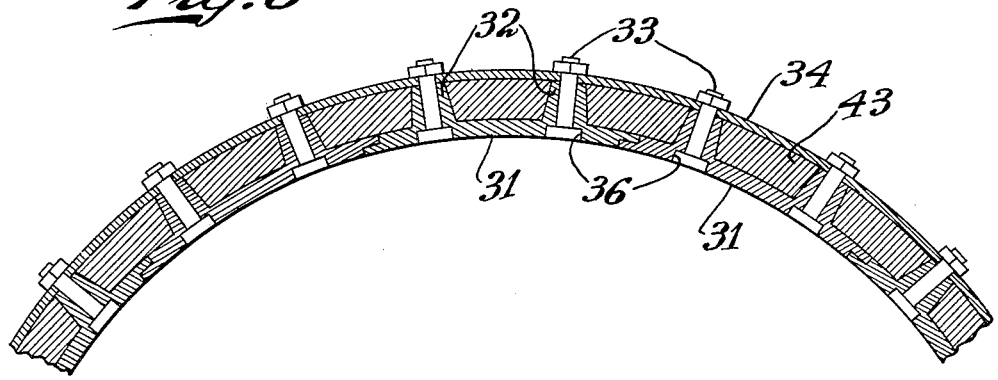
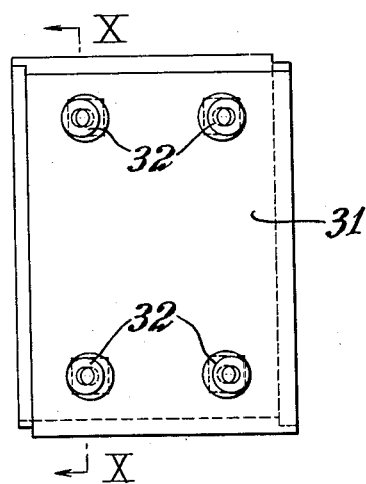
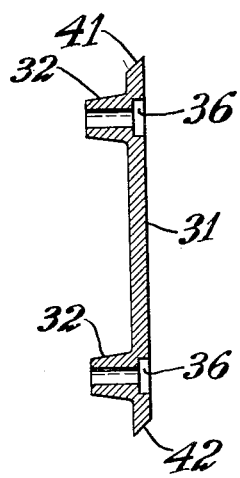
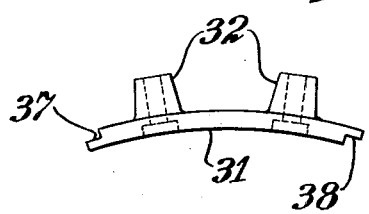
Inventor
M.E.Cushing
By Johnston & Jennings
Attorneys Patented Oct. 29, 1929

1,733,403

UNITED STATES PATENT OFFICE

MICHAEL E. CUSHING, OF ALABAMA CITY, ALABAMA

LINING FOR HOT-GAS-CARRYING CONDUITS

Application filed June 18, 1928. Serial No. 286,311.

My invention relates to a lining for hot gas-carrying conduits such as the downcomers for blast furnaces, hot blast mains and the like, and has for its object the provision of a lining which shall be enduring, relatively light in construction, and not subject to serious abrasion from dust laden hot gases.

A further object of my invention is to provide a novel metallic lining for hot gas-carrying conduits which shall be of light weight, together with novel means for insulating the lining from the outer jacket of the conduit.

A still further object of my invention is to provide, in a metallic lining for hot gas-carrying conduits, a special, hollow metallic refractory block which may be readily and easily insulated from the outside of the conduit.

Heretofore the lining for downcomers, dust catchers, gas mains and gas washers associated with blast furnaces, and conveying the hot gases, have been constructed of refractory non-metallic brick. Such linings are subject to serious abrasion and often have to be replaced due to the cutting out of the brick. The replacing of a lining in such a conduit necessitates a shutting down of a furnace which, as is well understood, is very expensive. While the advantages of a metallic lining, in so far as its freedom from abrasion is concerned, have heretofore been recognized, it has not been heretofore adopted for general use, due to its relatively great weight, to its expense, and to the fact that it radiates heat more freely than does a non-metallic refractory lining.

I have found that the above objection may be overcome by providing a relatively thin metallic inner lining with a non-metallic refractory backing which serves to reduce the weight and radiation of heat while the metallic inner lining resists the abrasive action of the dust laden gases. In carrying out my invention, the entire lining of the conduit may be faced with my improved metallic members or only such part as are subjected to the most severe cutting action of the gases may be lined.

In one form, my invention comprises metallic plates cast to form overlapping joints at the sides and ends to present a smooth inner surface to the conduit and having integrally cast lugs on the backs of the members cored out to accommodate bolts for securing the plate to the outer jacket of the conduit. In a preferred form of my invention, the metallic members are formed in the shape of hollow bricks or blocks which are closed on all sides except one and which are filled with a non-metallic refractory substance which acts as insulation. The metallic refractory bricks or blocks are laid up with refractory mortar the same as non-refractory bricks and are made in such shapes that they may be laid up in the form of an arch or circle or a straight wall in order to accommodate the shape of the conduit and present a smooth inner metallic surface for the conduit.

Apparatus embodying features of my invention is illustrated in the accompanying drawings, forming a part of this application, wherein Fig. 1 is a sectional view of a hot blast main having my improved lining applied thereto around a part of its inner surface where the cutting action of the blast is the greatest;

Figs. 2 to 7, inclusive, are views in front and end elevation, alternately, showing the different shapes in which my improved metallic refractory blocks are made;

Fig. 8 shows a modified form of my invention for use with conduits carrying relatively lower temperature gases than shown in Fig. 1;

Fig. 9 is a plan view of an individual block such as is shown in Fig. 8;

Fig. 10 is a sectional view taken along the line X—X of Fig. 9, and

Fig. 11 is a view in side elevation of one of the blocks.

Referring to the drawings, I show in Fig. 1 a hot blast main 10 at a point near a hot blast valve chamber 11 having a valve 12 disposed therein. As is well understood, the blast in such a situation exerts its greatest cutting effect around the arch 13 of the main. In the example shown, I provide a metallic lining around the arch 13 and provide the sides of the main with a non-metallic refractory lining 14.

The metallic refractory lining is comprised of hollow blocks 16 laid up with refractory mortar 17 in the way of ordinary non-metallic refractory bricks. The blocks 16 shown in detail in Figs. 2 and 3 are of a shape particularly adapted for a circular surface. Each of the blocks is hollowed out at 20 and open entirely on the back side so as to form a relatively thin wall hollow block. The interior of this block is filled with a suitable non-metallic refractory 18 which may be any one of desirable kinds of refractory cement, and which acts as insulation for the lining. Backing up the block 16 is a non-metallic refractory interlining 19 which serves as further insulation between the metallic inner lining and the outer jacket 21 of the blast main.

The hollow blocks for my improved lining may be made in any desirable shapes to conform to the shape of the conduit in which they are to be used. For example, I show in Figs. 4 and 5, a cored block 26 which is wedge shaped in cross section through its narrower dimension for laying up the sides of an arch. In Figs. 6 and 7 I show hollow blocks 27 which are wedge shaped in cross section along their longer dimension and which are suitable for arch wedges. The blocks 26 are open along their longer, wider side while the blocks 27 are open at their wider ends.

Referring now to Figs. 8 to 11, I show a modified form of my invention adapted for use in conduits which convey gases of lower temperatures than those shown in the previous figures of the drawing. The lining shown in Figs. 8 to 11 comprises arcuate shaped blocks 31 having cored lugs 32 cast integrally therewith for the reception of bolts 33 which secure the plates 31 to the outer jacket 34. The inner faces of the blocks 31 are cast with recesses 36 to receive the heads of the bolts 33. The opposite sides of each of the blocks 31 are undercut as at 37 and 38 to provide shiplap joints with adjacent blocks and are provided with oppositely beveled ends 41 and 42 to provide beveled joints with adjacent end members.

When assembled in the manner shown in Fig. 8, the space between the jacket 34 and the plates 31 is filled with a suitable non-metallic refractory insulation 43 which prevents undue radiation of heat from the main.

While I have shown my invention in several forms, it will be obvious to those skilled in the art that it is not so limited but is susceptible of various other changes and modifications, without departing from the spirit thereof, and I desire therefore, that only such limitations shall be placed thereupon as are imposed by the prior art, or as are specifically set forth in the appended claims.

What I claim is:

1. An inner lining for hot gas-carrying conduits comprising hollow refractory metallic blocks filled with refractory mortar.

2. An inner lining for hot gas carrying conduits comprising hollow refractory metallic blocks filled with refractory mortar, and laid up with refractory mortar between the blocks.

3. An inner lining for hot gas-carrying conduits comprising hollow refractory metallic blocks filled with refractory mortar, laid up with refractory mortar between the blocks, and a non-metallic refractory backing for the metallic blocks.

4. A lining for hot gas-carrying conduits comprising hollow metallic refractory blocks, each of the blocks being open along one side thereof and closed on all other sides, a filling of refractory mortar within the hollow of the block, and a non-metallic refractory backing for the blocks, the closed sides of the blocks being disposed toward the inner side of the conduit.

In testimony whereof I affix my signature.

MICHAEL E. CUSHING.